J. EDGAR & A. BARDELL.
Frying-Pan.

No. 200,033. Patented Feb. 5, 1878.

Witnesses.
Otto Hufeland.
Hugo Brueggemann

Inventors.
James Edgar
Alfred Bardell
by
Van Santvoord & Hauff
their attys

UNITED STATES PATENT OFFICE.

JAMES EDGAR, OF NEW YORK, AND ALFRED BARDELL, OF BROOKLYN, E. D., N. Y.

IMPROVEMENT IN FRYING-PANS.

Specification forming part of Letters Patent No. 200,033, dated February 5, 1878; application filed January 23, 1878.

*To all whom it may concern:*

Be it known that we, JAMES EDGAR, of the city, county, and State of New York, and ALFRED BARDELL, of Brooklyn, E. D., in the county of Kings and State of New York, have invented a new and useful Improvement in Frying-Pans, which invention is fully set forth in the following specification, reference being had to the accompanying drawing, in which—

Figure 1:
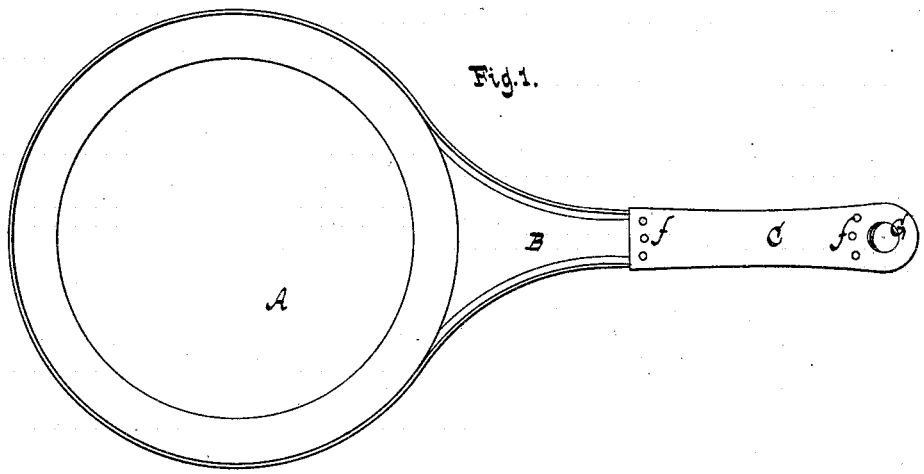
Figure 2:
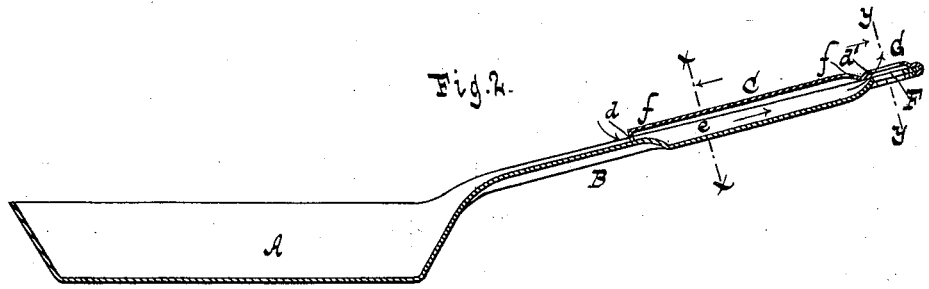
Figure 3:
Figure 4:

Figure 1 represents a plan or top view of a pan containing our improvement. Fig. 2 is a longitudinal section thereof. Fig. 3 is a cross-section of the handle in the line $x\ x$, Fig. 2. Fig. 4 is a similar section in the line $y\ y$, Fig. 2.

Similar letters indicate corresponding parts.

This invention relates to improvements in frying-pans which are constructed or provided with tubular perforated handles, to afford a free circulation of air through them to prevent excessive heating of said handles.

Our invention consists in combining with a pan-handle a ventilated covering, so that the handle can be taken hold of without danger of injuring one's fingers, either by its edges or by heat. The handle-covering is open at or near its opposite ends, so that the air enters at one end thereof, and escapes at the other end; and by this arrangement the covering is effectually ventilated, while it can be left solid, so as to present a plain surface.

The pan-handle is provided with upwardly-projecting flanges on its opposite edges, and the covering is made to catch over or around such flanges, whereby a simple and effective union between the handle and the covering is produced, while at the same time an enlarged ventilating-space is created between them. The handle-covering has a hole which registers with the ordinary suspension-hole in the handle, and forms a source of communication between the opening at the outer end of the covering and the atmosphere, so that the covering can be made to overlap the handle adjacent to said hole or holes, and also at its extreme end, and is thus firmly united with the handle at these points.

In the drawing, the letter A designates the body of a pan, the handle B of which is provided with our covering, (marked C.) This covering C is, in the example shown, applied to a pan in which the handle is formed in one piece with the body; but it is also applicable to one in which the handle is made separately and attached to the body. Said covering C may be made to extend the entire length of the handle B, or through only a portion of its length, as may be found most expedient. $d\ d'$ are openings by which air is admitted beneath the covering C. One of these openings is formed at the extreme inner end of the covering C, while the other is, in the present example, located near the outer end thereof. We prefer to form these openings $d\ d'$ by simply leaving the edges of the covering C unfastened at the proper points, and slightly cutting such free edges.

That portion of the handle B which is encompassed by the covering C is bent so as to form flanges $e\ e$ on the opposite edges thereof, (see Fig. 3,) and over or around these flanges we bend the opposite edges of the covering C.

The handle B is provided with a hole, F, near its outer end, and at a point opposite to this hole in the covering C is formed a corresponding hole, G, this hole G thus registering with the hole F. The opening $d'$ in the covering C is formed next to the hole G, and communicates with the atmosphere through the same. Adjacent to the holes F G in the covering C, and also at the extreme end of the handle B, the covering is made to overlap the edges of the handle, as seen in Fig. 4. By the covering C a person's fingers are protected against injury in grasping the pan-handle, the covering being cooled by the air circulating through the openings $d\ d'$, while the edges of the handle are overspread thereby. By the flanges $e\ e$ the covering C is firmly united with the handle, and at the same time an enlarged space is created between them for the circulation of air. The hole G in the covering permits of hanging up the pan, as heretofore, and by arranging the opening $d'$ to communicate with the atmosphere through said hole, the covering can be firmly secured to the handle, at and near its outer end, in the manner stated—namely, by bending the edge of the covering round this part of the handle. In some cases holes $f$ are formed in the covering C, near the opposite ends thereof, for the purpose of increasing the effect of the openings $d\ d'$.

We are aware that ventilated handles have been made in the form of hollow foraminous cylinders; but such would not answer our purpose, particularly if the handle is stamped out of one piece with the pan; furthermore, such handles are too heavy for our purpose, and their appearance is not what we like.

What we claim as new, and desire to secure by Letters Patent, is—

1. The combination, with the solid handle of a pan, of an attached covering-plate, C, provided with openings to permit of the circulation of air between the said handle and covering-plate, substantially as described.

2. The combination, with a pan-handle having upwardly-projecting flanges on its opposite edges, of a ventilated covering catching over or around said flanges, substantially as and for the purpose described.

3. The combination, with a pan-handle, of a ventilated covering, which is open at or near its opposite ends, and is provided with a hole, which registers with a hole in the handle, and forms a source of communication between the opening at or near the outer end of the covering and the atmosphere, substantially as and for the purpose described.

In testimony that we claim the foregoing we have hereunto set our hands and seals this 22d day of January, 1878.

JAMES EDGAR. [L. S.]
ALFRED BARDELL. [L. S.]

Witnesses:
W. HAUFF,
E. F. KASTENHUBER.